United States Patent
Singh et al.

(10) Patent No.: US 9,609,667 B2
(45) Date of Patent: Mar. 28, 2017

(54) PROCEDURE FOR SETTING THRESHOLD FOR ACCESSING CHANNEL

(71) Applicant: Nokia Technologies Oy, Espoo (FI)

(72) Inventors: Sarabjot Singh, Berkeley, CA (US); Sayantan Choudhury, Berkeley, CA (US); Esa Tuomaala, El Cerrito, CA (US)

(73) Assignee: Nokia Technologies Oy, Espoo (FI)

( * ) Notice: Subject to any disclaimer, the term of this patent is extended or adjusted under 35 U.S.C. 154(b) by 115 days.

(21) Appl. No.: 14/640,120

(22) Filed: Mar. 6, 2015

(65) Prior Publication Data

US 2016/0262054 A1 Sep. 8, 2016

(51) Int. Cl.
*H04W 74/08* (2009.01)
*H04W 72/08* (2009.01)

(52) U.S. Cl.
CPC ...... *H04W 74/0808* (2013.01); *H04W 72/085* (2013.01)

(58) Field of Classification Search
None
See application file for complete search history.

(56) References Cited

U.S. PATENT DOCUMENTS

| | | | | |
|---|---|---|---|---|
| 2011/0149792 | A1* | 6/2011 | Nakano | H04W 24/10 370/252 |
| 2014/0086081 | A1* | 3/2014 | Mack | H04L 5/006 370/252 |
| 2014/0328268 | A1* | 11/2014 | Zhu | H04W 74/002 370/329 |
| 2014/0328270 | A1* | 11/2014 | Zhu | H04W 74/002 370/329 |
| 2015/0296528 | A1* | 10/2015 | Coffey | H04W 74/0808 370/338 |
| 2015/0319700 | A1* | 11/2015 | Oteri | H04W 52/10 455/127.1 |
| 2016/0227489 | A1* | 8/2016 | Oteri | H04W 52/243 455/522 |

* cited by examiner

*Primary Examiner* — Hassan Kizou
*Assistant Examiner* — Hashim Bhatti
(74) *Attorney, Agent, or Firm* — Harrington & Smith

(57) ABSTRACT

This document discloses a solution for determining a channel assessment threshold in an apparatus. A method according to this solution includes: determining, by the apparatus, a channel assessment threshold based on a factor representative of a signal-to-interference ratio at another apparatus with which said apparatus has established a link; determining, by the apparatus on the basis of the channel assessment threshold, whether or not a channel is free for transmission over the link; and upon determining the channel to be free, causing transmission of a frame.

16 Claims, 5 Drawing Sheets

PROCEDURE FOR SETTING THRESHOLD FOR ACCESSING CHANNEL

FIELD

The invention relates to the field of wireless communications and, particularly, to scanning for a wireless network in a wireless device.

BACKGROUND

A wireless device may be configured to carry out a channel sensing procedure before accessing a channel. The channel sensing may be based on measuring the channel and comparing measurement results with a threshold. If the channel is determined, on the basis of the comparison, to be idle or to contain transmissions that allow simultaneous channel access, the wireless device may access the channel and carry out a frame transmission. Otherwise, the wireless device may refrain from the channel access. Setting the threshold may be important in terms of spectral efficiency and/or interference control.

BRIEF DESCRIPTION

According to an aspect, there is provided a method, comprising: determining, by an apparatus, a channel assessment threshold based on a factor representative of a signal-to-interference ratio at another apparatus with which said apparatus has established a link; determining, by the apparatus on the basis of the channel assessment threshold, whether or not a channel is free for transmission over the link; and upon determining the channel to be free, causing transmission of a frame.

According to another aspect, there is provided an apparatus comprising at least one processor and at least one memory including a computer program code. The at least one memory and the computer program code are configured, with the at least one processor, to cause the apparatus to: determine a channel assessment threshold based on a factor representative of a signal-to-interference ratio at another apparatus with which said apparatus is configured to establish a link; determine, on the basis of the channel assessment threshold, whether or not a channel is free for transmission over the link; and upon determining the channel to be free, cause transmission of a frame.

According to another aspect, there is provided a computer program product embodied on a non-transitory distribution medium readable by a n apparatus and comprising program instructions which, when loaded into the apparatus, execute a computer process comprising: determining, by the apparatus, a channel assessment threshold based on a factor representative of a signal-to-interference ratio at another apparatus with which said apparatus has established a link; determining, by the apparatus on the basis of the channel assessment threshold, whether or not a channel is free for transmission over the link; and upon determining the channel to be free, causing transmission of a frame.

Embodiments of the invention are defined in dependent claims.

LIST OF DRAWINGS

Embodiments of the present invention are described below, by way of example only, with reference to the accompanying drawings, in which FIG. 1 illustrates an example of a wireless communication scenario to which embodiments of the invention may be applied;

DESCRIPTION OF EMBODIMENTS

The following embodiments are examples. Although the specification may refer to "an", "one", or "some" embodiment(s) in several locations, this does not necessarily mean that each such reference is referring to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
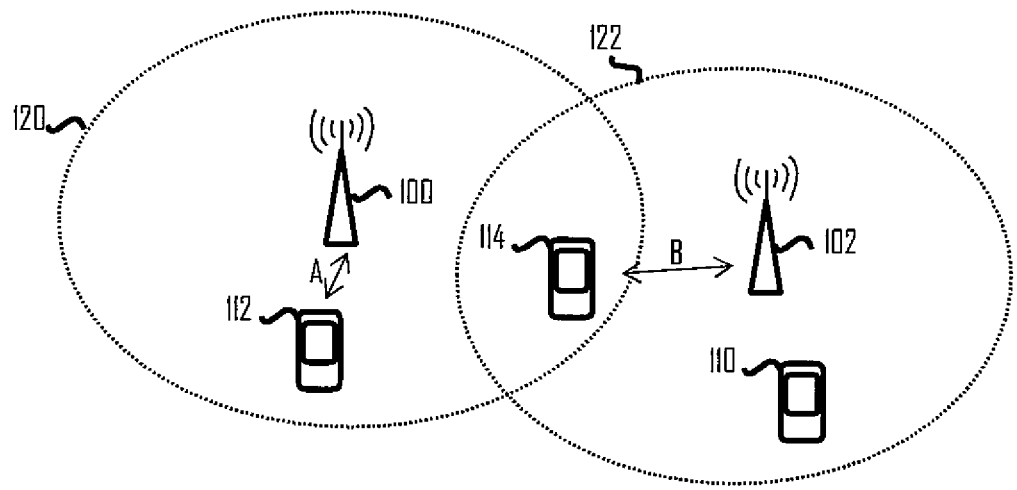

A general wireless communication scenario to which embodiments of the invention may be applied is illustrated in FIG. 1. FIG. 1 illustrates wireless communication devices comprising a plurality of access points (AP) 100, 102 and a plurality of wireless terminal devices (STA) 110, 112, 114. Each base station may be associated with a basic service set (BSS) which is a basic building block of an IEEE 802.11 wireless local area network (WLAN). The most common BSS type is an infrastructure BSS that includes a single AP together with all STAs associated with the AP. The AP may be a fixed AP or it may be a mobile AP. The APs 100, 102 may also provide access to other networks, e.g. the Internet. In another embodiment, the BSS may comprise a plurality of APs to form an extended service set (ESS). While embodiments of the invention are described in the context of the above-described topologies of IEEE 802.11 specifications, it should be appreciated that these or other embodiments of the invention may be applicable to networks based on other specifications, e.g. other versions of the IEEE 802.11, WiMAX (Worldwide Interoperability for Microwave Access), UMTS LTE (Long-term Evolution for Universal Mobile Telecommunication System), and other networks having cognitive radio features, e.g. transmission medium sensing features and adaptiveness to coexist with radio access networks based on different specifications and/or standards. Some embodiments may be applicable to networks having features under development by IEEE 802.19 task group 1l (TG1).

IEEE 802.11n specification specifies a data transmission mode that includes 20 megahertz (MHz) wide primary and secondary channels. The primary channel is used in all data transmissions with clients supporting only the 20 MHz mode and with clients supporting higher bandwidths. A further definition in 802.11n is that the primary and secondary channels are adjacent. The 802.11n specification also defines a mode in which a STA may, in addition to the primary channel, occupy one secondary channel which results in a maximum bandwidth of 40 MHz. IEEE 802.11ac task group extends such an operation model to provide for wider bandwidths by increasing the number of secondary channels from 1 up to 7, thus resulting in bandwidths of 20 MHz, 40 MHz, 80 MHz, and 160 MHz. A 40 MHz transmission band may be formed by two contiguous 20 MHz bands, and an 80 MHz transmission band may be formed by two contiguous 40 MHz bands. However, a 160 MHz band may be formed by two contiguous or non-contiguous 80 MHz bands.

As mentioned above, the transmission band of a BSS contains the primary channel and zero or more secondary channels. The secondary channels may be used to increase data transfer capacity of a transmission opportunity (TXOP). The secondary channels may be called a secondary channel, a tertiary channel, a quaternary channel, etc. However, let us for the sake of simplicity use the secondary channel as the common term to refer also to the tertiary or quaternary channel, etc. The primary channel may be used for channel contention, and a TXOP may be gained after successful channel contention on the primary channel. Some IEEE 802.11 networks are based on carrier sense multiple access with collision avoidance (CSMA/CA) for channel access. Some networks may employ enhanced distributed channel access (EDCA) which provides quality-of-service (QoS) enhancements to medium access control (MAC) layer. The QoS enhancements may be realized by providing a plurality of access categories (AC) for prioritizing frame transmissions. The access categories may comprise the following priority levels in the order of increasing priority: background (AC_BK), best effort (AC_BE), video streaming (AC_VI), and voice (AC_VO). A higher priority frame transmission may use a shorter contention window and a shorter arbitration inter-frame spacing (AIFS) that result in higher probability of gaining the TXOP. Furthermore, some networks may employ restricted access windows (RAW) where a reduced set of wireless devices of the wireless network may carry out channel contention. The access node may define the RAW and a group of wireless devices that are allowed to attempt the channel access within the RAW. Grouping allows partitioning of the wireless devices into groups and restricting channel access only to wireless devices belonging to a specified group at any given time period. The time period may be enabled by allocating slot duration and a number of slots in RAW access. The grouping may help to reduce contention by restricting access to the medium only to a subset of the wireless devices. The grouping may also reduce the signalling overhead.

The STA (or AP) may carry out a clear-channel assessment (CCA) procedure in order to determine whether the channel is free or busy. Upon detecting radio energy that exceeds a preset threshold on the channel, the STA may determine that the channel is busy and prevent the transmission. On the other hand, if the STA detects no radio energy exceeding the threshold on the channel during the determined time period, it may carry out the transmission. The STA may use a single threshold in the CCA procedure but, in some embodiments, a plurality of thresholds and frame detection are applied. Upon detecting a transmission on the channel, the STA may determine whether the on-going transmission is a frame header or frame payload portion. An example of the frame header is a physical layer convergence protocol (PLCP) header, while an example of the frame payload portion is a physical layer service data unit (PSDU). Then, the STA may determine a threshold for use with the detected transmission. For example, a first threshold may be applied to the frame header while a second, different threshold may be applied to the frame payload portion. The first threshold may be denoted by a carrier sensing header threshold, while the second threshold may be denoted by a carrier sensing data unit threshold. By default, the carrier sensing data unit threshold may be −62 decibels with respect to one milliwatt (dBm), while the carrier sensing header threshold may be −82 dBm. Accordingly, the STA may be more sensitive with respect to frame headers than with respect to frame payload portions. This ensures that the headers will less likely collide with other impending transmissions, while spatial reuse of the channel is encouraged for payload portions. According to another aspect, a channel may be considered busy if the STA is able to decode a PLCP header when a signal is detected with power level between −82 dBm and −62 dBm, and the channel may be considered busy if a signal with power level above −62 dBm is detected even if the STA is not able to decode the PLCP header.

A virtual carrier sensing function is provided by the provision of a network allocation vector (NAV) which is used to reserve a channel for the duration of the TXOP. Most of the transmitted frames comprise a duration field which can be used to reserve the medium, or provide duration of the NAV protection, for the duration indicated by the value of the duration field. In practice, the NAV is a timer that indicates the amount of time the medium will be reserved. In a typical operation, the transmitting station (STA) will set the value of the duration field according to the time for which it expects to use the medium while all receiving STAs, except the intended receiver, update their NAV appropriately with the information in the duration field and count down from the NAV to zero before starting the channel contention. The virtual carrier sensing function indicates that the medium is busy when NAV is non-zero and idle when NAV is zero. The NAV may be set to protect frame transmissions. The communication devices obtain the NAV on the primary channel of the BSS.

As described above, the BSS may be represented by the access node and one or more terminal devices connected to the access node. In the example of FIG. 1, the access node 100 and the terminal devices 112, 114 may be comprised in the first BSS and, thus, in the same wireless network while the terminal device 110 and the access node 102 may be comprised in a second BSS which may be a neighbour to the first BSS and an OBSS with respect to the first BSS. This is a common situation in dense deployment scenarios where multiple overlapping wireless networks have been installed. The first BSS and the second BSS may be overlapping BSSs in the sense that at least some of the devices first BSS are capable of receiving frames from the second BSS and vice versa. This creates a potential interference scenario between the BSSs, if they operate on the same channel(s).

With respect to the definition of the wireless network in the context of the present description, the wireless network may comprise a single BSS or a plurality of BSSs. According to a viewpoint, the wireless network may comprise a plurality of BSSs that have the same service set identifier (SSID) the same roaming identifier, and/or the same roaming partnership.

A terminal device may establish a connection with any one of the access nodes it has detected to provide a wireless connection within the neighbourhood of the terminal device. In the example of FIG. 1, let us assume a situation where the terminal device 112 located within a coverage area 120 of the access node 100 establishes a connection to that access node 100. The connection establishment may include authentication in which an identity of the terminal device is established in the access node. The authentication may comprise exchanging an encryption key used in the BSS. After the authentication, the access node and the terminal device may carry out association in which the terminal device is fully registered in the BSS, e.g. by providing the terminal device with an association identifier (AID). It should be noted that in other systems terms authentication and association are not necessarily used and, therefore, the association of the terminal device to an access node should be understood broadly as establishing a connection between the terminal device and the access node such that the terminal device is in a connected state with respect to the access node and scanning for downlink frame transmissions from the access node and its own buffers for uplink frame transmissions.

The terminal device 110 located in a coverage area 122 of the access node 102 may associate to the access node 102, and the terminal device 114 located in both coverage areas 120, 122 may associate to either access node 100, 102. The terminal devices 100 to 114 may discover the access nodes 100, 102 through a network discovery process.

IEEE 802.11ai task group defines principles for fast initial link setup (FILS). One aspect of the principles is to enable faster and more precise AP and network discovery. Some principles relate to passive scanning in which a scanning device, e.g. a STA, passively scans channels for any beacon, management, or advertisement frames. Other principles relate to active scanning in which the scanning device actively transmits a scanning request message, e.g. a Probe Request message or a generic advertisement service (GAS) request, in order to query for present APs or networks. The probe request may also set some conditions that a responding device should fulfil in order to respond to the probe request. In some embodiments, the scanning device may be called a requesting device or a requesting apparatus. Responding devices may transmit scanning response messages, e.g. Probe Response messages, in response to the scanning request message, wherein the scanning response message may contain information on the responding device, its network, and other networks. Embodiments of the scanning enhancements described herein encompass the network discovery signalling, probe request-response processes, as well as GAS request-response processes.

Some wireless networks enable overlapping simultaneous transmissions. The overlapping transmission may refer to a frame transmission that is carried out simultaneously and on the same frequency channel, e.g. on the same primary channel, as another frame transmission. A device may indicate the allowance of the overlapping transmissions by transmitting a frame comprising in its header an information element indicating whether or not the device allows overlapping transmissions. The information element may comply with a Color field defined in IEEE 802.11ah specifications or another similar field. The field may comprise three or more bits. The field may be present in an S1G field of a preamble of a physical layer convergence protocol (PLCP) protocol data unit (PPDU). The field may have values from 0 to 7, wherein one value is used when the frame is a control frame and the value indicates that overlapping transmissions are not allowed. The other values may indicate that overlapping transmissions are allowed. The other values may be distributed between access nodes of neighbouring or overlapping wireless networks in a determined manner in order to enable a terminal device to identify an access node of its own wireless network from the field. Accordingly, the terminal device may carry out overlapping transmissions upon detecting a value that allows the overlapping transmissions and is not a value used by the access node of its own wireless network. Upon detecting a value that allows the overlapping transmissions and is the value used by the access node of its own wireless network, the terminal device may prevent the overlapping transmission. The access nodes may negotiate about the values or a centralized controller may allocate a unique value for each access node. The S1G field may further comprise parameters enabling a receiver of the frame to decide under which circumstances the channel is considered to be busy and the overlapping transmission shall not be triggered even though the field indicates allowance of the overlapping transmissions. For example, if the terminal device 112 detects a frame that allows overlapping transmissions but that the frame is an uplink transmission to the access node 100, the terminal device may prevent overlapping transmission to the access node 100. Similarly, the terminal device may prevent overlapping transmission with the access node of its own access node.

In general, two wireless networks 120, 122 having overlapping coverage areas may enable overlapping transmissions. Accordingly, a device of a first wireless network may be allowed to transmit simultaneously with a device of a second wireless network. This may improve channel utilization and spectral efficiency, e.g. area spectral efficiency in a certain area comprising one or more wireless networks, but it may cause problems because a receiver of the first wireless network may experience interference from the second wireless network as stronger than the transmitting device of the first wireless network. Accordingly, throughput may be decreased under some scenarios.

An apparatus may determine a channel assessment threshold on the basis of whether or not it has detected the allowance of the overlapping transmissions by another apparatus. A first threshold may be associated with a higher signal strength sensed from the channel, and a second threshold may be associated with a lower signal strength sensed from the channel during a channel assessment procedure, e.g. the CCA procedure. If the signal strength measure from the channel exceeds the threshold currently employed, the apparatus will refrain from channel access. For example, a threshold of −62 dBM may be used when the overlapping transmissions are allowed and −82 dBM when the overlapping transmissions are not allowed. As a consequence, the device initiating the overlapping transmission determines the channel to be idle more probably in the case where the overlapping transmissions are allowed than in the case where the overlapping transmissions are not allowed.

A guiding principle behind the use of the channel sensing thresholds is to avoid interference irrespective of the real quality of communication links. This may lead to a very conservative spatial channel reuse and lead to a low density of simultaneous transmissions, e.g. to low (area) spectral efficiency. For example in the scenario of FIG. 1, the use of the fixed mechanism with respect to the CCA thresholds may prevent simultaneous transmission for links between even though the links' signal-to-interference-plus-noise ratio (SINR) would be sufficient in a case where the simultaneous transmission are allowed. For example, the terminal device 114 detecting the transmission of the access node 100 may determine not to access the channel even though an intended receiver (the access node 102) does not suffer from the interference coming from the access node 100. It is worthy to note here that the SINR at the receiver is one factor that drives the packet error rate (PER) at the receiver. Therefore, a properly adjusted CCA threshold aware of their respective SINR may allow both links A and B to transmit to their respective receivers successfully.

Figure 2:
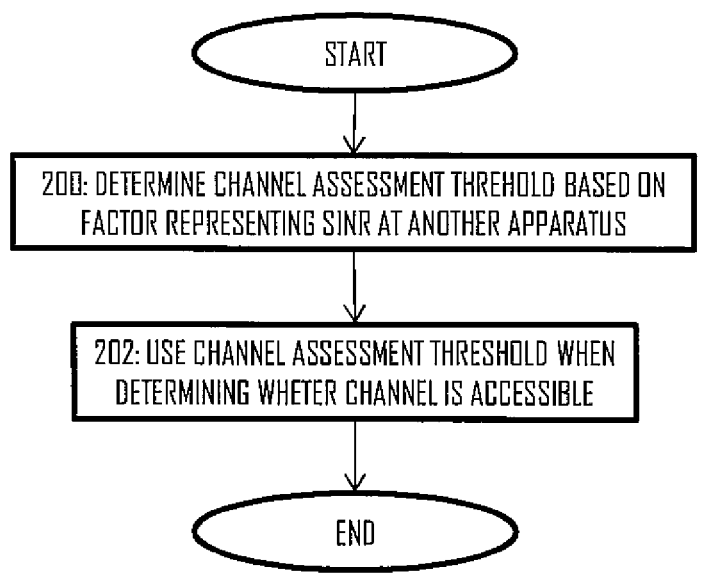
FIG. 2 illustrates a flow diagram of a process for selecting a channel assessment threshold according to an embodiment of the invention.

FIG. 2 illustrates a process for selecting a channel assessment threshold adaptively in an apparatus. Referring to FIG. 2, the process comprises in an apparatus: determining, by the apparatus, a channel assessment threshold based on a factor representative of a signal-to-interference ratio at another apparatus with which said apparatus has established a link (block 200); determining, by the apparatus on the basis of the channel assessment threshold, whether or not a channel is free for transmission over the link; and upon determining the channel to be free, causing transmission of a frame (block 202).

The apparatus performing the process of FIG. 2 may map the factor representative of the signal-to-interference ratio to the channel assessment threshold to be used in the channel access over the link. The advantage of using such a factor is that a transmitter (said apparatus) takes the interference environment at the receiver (the other apparatus) into consideration when determining whether or not to carry out a frame transmission to the receiver. This may improve area spectral efficiency.

In an embodiment, the factor representative of the signal-to-interference ratio at the other apparatus comprises a modulation and coding scheme used for transmission over the link, e.g. form the apparatus to the other apparatus. In such a case, block 200 may comprise determining, by the apparatus, said modulation and coding scheme used for transmission over the link and determining, by the apparatus, the channel assessment threshold based on the modulation and coding scheme.

The signal-to-interference ratio (SIR) may take into account thermal noise as well and, thus, it may be considered as a signal-to-interference-plus-noise ratio (SINR).

Another embodiment of said factor representing the SIR or SINR at the receiver is a SIR or SINR estimate measured by the receiver and transmitted by the receiver to the transmitter. The transmitter may then map the SIR or SINR estimate to the channel assessment threshold. In the embodiments below, the MCS is used as an example of the factor but it should be appreciated that another factor representative of the SINR at the receiver may be equally used in the embodiments described herein.

In particular, the MCS mapped to the channel assessment threshold may be the MCS employed in transmissions from the apparatus to the other apparatus. The MCS may be considered as a representation of a channel quality between the apparatuses and, thus, it may represent the interference level observed at the receiver (the other apparatus). In case of low interference, a high order MCS is selected. The high order MCS may comprise quadrature amplitude modulation (QAM) as a modulation technique, e.g. 64-QAM, and channel coding less tolerant to interference. In case of high interference, a low order MCS is selected. The low order MCS may comprise quadrature phase shift keying (QPSK) as a modulation technique, and channel coding more tolerant to interference. An advantage provided by the method of FIG. 2 is that the transmitter (the apparatus) may employ information on the interference experienced by the receiver (the other apparatus) when evaluating whether or not the channel is accessible. Accordingly, the channel access probability for links having high channel quality is increased, thus increasing the spectral efficiency of the link. Overall spectral efficiency is also improved because of higher probability for overlapping transmissions on a given channel, e.g. a frequency channel.

In an embodiment, the MCS is mapped to the channel assessment threshold such that the channel is more probably considered to be free when the order of the modulation and coding scheme is high than when the order of the modulation and coding scheme is low.

In an embodiment, the channel assessment threshold is a reception sensitivity threshold employed by the apparatus to determine whether or not the channel is available for channel access. A higher order of MCS may be mapped to a higher reception sensitivity threshold, and a lower order of MCS may be mapped to a lower reception sensitivity threshold. Upon measuring a signal from the channel during the channel assessment, e.g. CCA, wherein the signal exceeds the reception sensitivity threshold, the apparatus may determine the channel to be busy and refrain from the channel access. Upon measuring no signal exceeding the reception sensitivity threshold, the apparatus may determine the channel to be idle and access the channel. Accordingly, the higher the channel assessment threshold is, the higher is the probability that the apparatus determines the channel to be idle.

In an embodiment the channel assessment threshold is the CCA threshold of the WLAN.

Figure 3:
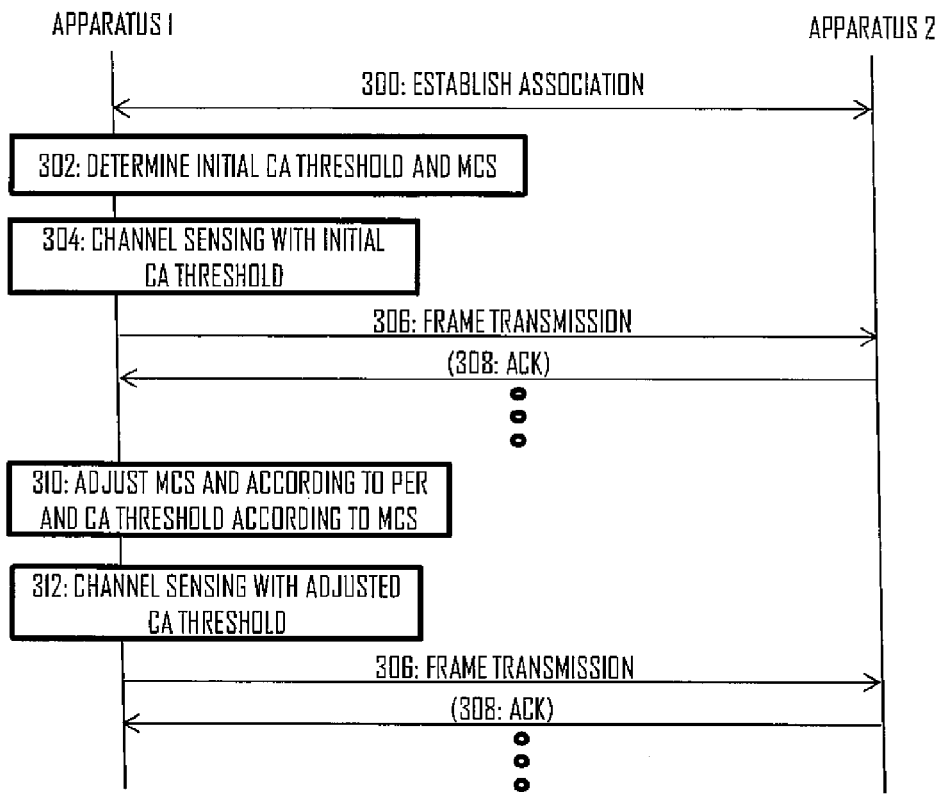
FIG. 3 illustrates a process for selecting the channel assessment threshold by using implicit information according to an embodiment of the invention.

Let us now consider some embodiments of FIG. 2. FIG. 3 illustrates a signalling diagram between two apparatuses: a first apparatus (Apparatus 1) and a second apparatus (Apparatus 2). One of the apparatuses may be an access node and the other may be a terminal device, or both apparatuses may be terminal devices, or both apparatuses may be access nodes. Referring to FIG. 3, let us assume a situation where the first apparatus performs frame transmissions to the second apparatus for the sake of simplicity. Naturally, the second apparatus may also perform frame transmissions to the first apparatus, and then the procedure may simply be mirrored. In step 300, the apparatuses establish association with one another for frame transmissions over the association. The association may also be referred to a link, which is the term used in connection with FIG. 2.

In block 302, the first apparatus determines initial channel assessment threshold towards the second apparatus and a MCS to be used in frame transmissions to the second apparatus. In an embodiment of block 302, the apparatuses negotiate the initial channel assessment threshold and the MCS during the step 300. In another embodiment, the first apparatus selects a default value for the channel assessment threshold and a default initial MCS. In an embodiment, the initial channel assessment threshold and the MCS are selected on the basis of measurements, e.g. measuring a received signal strength indicator (RSSI) or a similar interference metric on the channel employed in the link. The RSSI or the metric may then be mapped to the initial channel assessment threshold and the MCS according to a mapping table. Table 1 below illustrates an exemplary mapping table between the MCS and the RSSI.

TABLE 1

| RSSI (dBm) | MCS Index |
|---|---|
| RSSI <−83 | 0 |
| −83 < RSSI < −80 | 1 |
| −80 < RSSI < −78 | 2 |
| −78 < RSSI < −73 | 3 |
| −73 < RSSI < −68 | 4 |
| −68 < RSSI < −64.5 | 5 |
| −64.5 < RSSI < −61.5 | 6 |
| −61.5 < RSSI < −59 | 7 |
| −59 < RSSI < −55 | 8 |
| RSSI >−55 | 9 |

A similar association table may be used to derive the initial channel assessment threshold. Table 2 below illustrates the mapping between the MCS index of Table 1 and the channel assessment threshold but, obviously, the mapping may be provided between the RSSI and the channel assessment threshold. The values of the channel assessment thresholds are provided in decibels per milliwatt (dBm).

TABLE 2

| Channel Assessment Threshold (dBm) | MCS Index |
|---|---|
| −80.5 | 0 |
| −77.5 | 1 |
| −72.5 | 2 |
| −68 | 3 |
| −67 | 4 |
| −64.5 | 5 |
| −62 | 6 |
| −61 | 7 |
| −59.5 | 8 |
| −57.5 | 9 |

Upon selecting the initial channel assessment threshold, the first apparatus may employ the selected threshold in channel sensing (block 304) that is used in connection with channel access attempt. Upon detecting no radio signal having a strength, for example power or energy, that exceeds the threshold, the first apparatus may determine the channel to be accessible and perform a frame transmission to the second apparatus in step 306. If the second apparatus receives the frame correctly, it may respond with an acknowledgment frame or a block acknowledgment frame (step 308). Upon not decoding the frame correctly, the second apparatus may transmit no acknowledgment or transmit a negative acknowledgment, depending on the protocol employed.

The first apparatus may store a record of the received acknowledgments with respect to the transmitted frames or packets. Accordingly, the first apparatus may monitor a packet error rate (PER) of transmissions to the second apparatus. The first apparatus may employ the PER in adapting the MCS and the channel assessment threshold. The first apparatus may first determine a new MCS in block 310 and, then, select a new channel assessment threshold by using the mapping of Table 2, for example. In block 312, the first apparatus may perform the channel sensing with the new channel assessment threshold.

Figure 4:
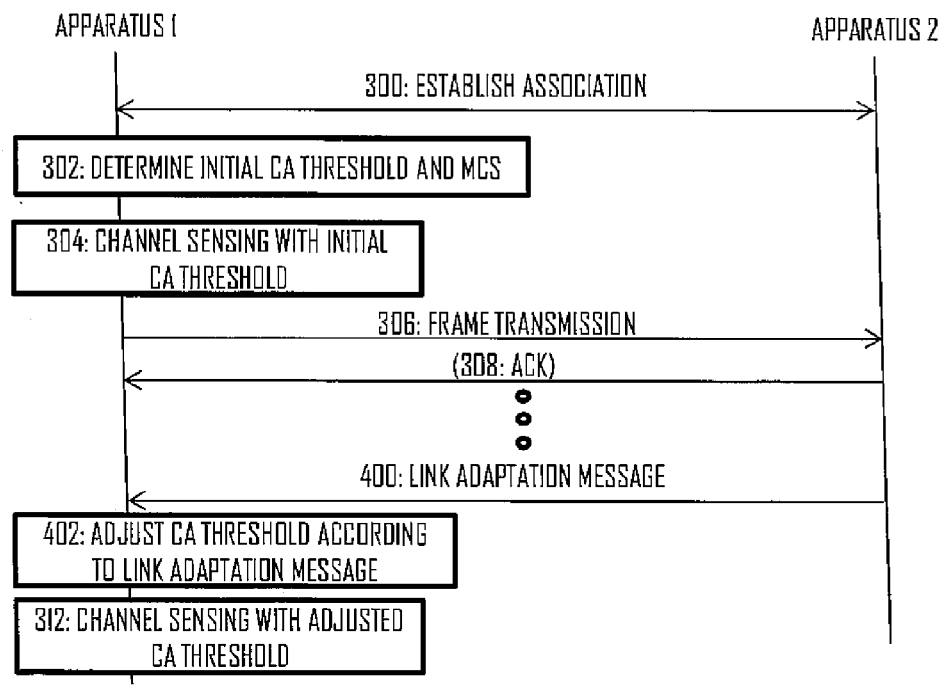
FIG. 4 illustrates a process for selecting the channel assessment threshold by using explicit information according to an embodiment of the invention.

FIG. 4 illustrates an embodiment where the new MCS is requested by the second apparatus. Referring to FIG. 4, the steps having the same reference number as in FIG. 3 illustrate substantially similar steps or functions. During the association, the second apparatus may determine that the MCS shall be changed and, as a consequence, transmit a link adaptation message to the first apparatus in step 400. The link adaptation message may specify the new MCS requested by the second apparatus. The first apparatus may acknowledge the change of the MCS to the second apparatus upon receiving the link adaptation message. In block 402, the first apparatus selects the new MCS and, furthermore, selects a new channel assessment threshold by using the mapping of Table 2 or Table 3 below, for example. In block 312, the first apparatus may perform the channel sensing with the new channel assessment threshold.

Figure 5:
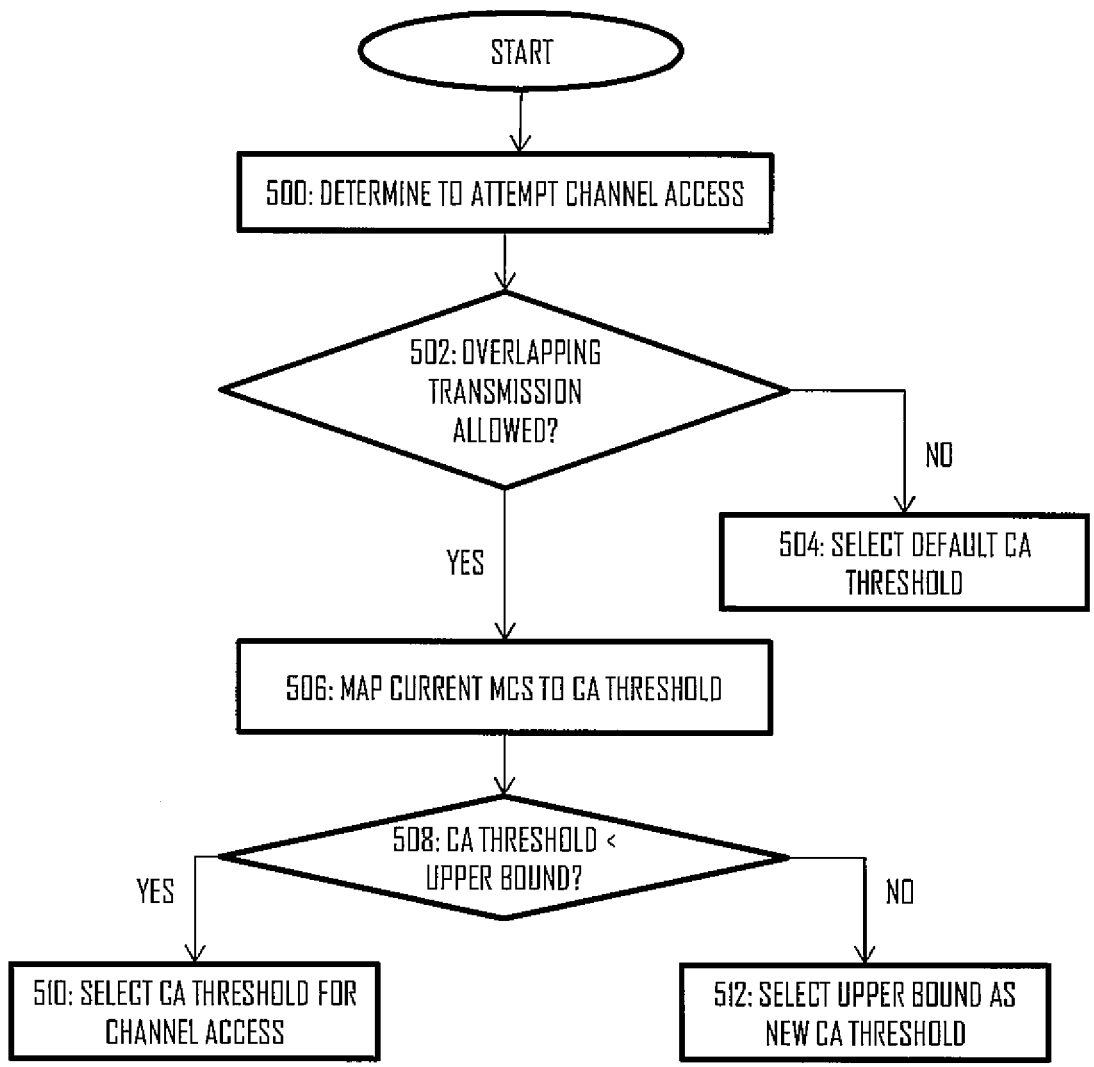
FIGS. 5 to 7 illustrate further embodiments for selecting the channel assessment threshold.
Figure 6:
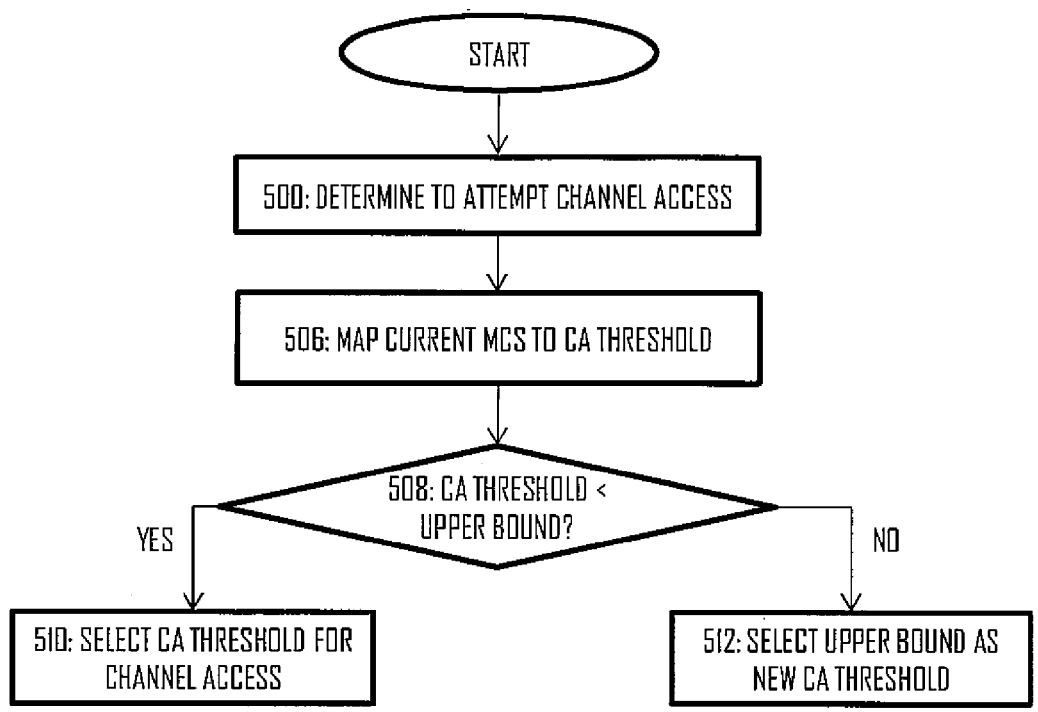

Let us now consider some algorithms for selecting the channel assessment threshold on the basis of the MCS with reference to FIGS. 5 and 6. The process of FIG. 5 or FIG. 6 may be carried out every time the apparatus performing the process determines to attempt channel access (block 500). Referring to FIG. 5, the apparatus may first, upon determining to attempt the channel access, determine whether or not it has detected an ongoing transmission within the wireless network of the apparatus (block 502). If there is an ongoing transmission in the wireless network, the apparatus may proceed to block 504 in which the apparatus may select a default channel assessment threshold. The default channel assessment threshold may have the lowest value among the possible channel assessment thresholds available to the apparatus, which may mean that the apparatus will have the highest probability of avoiding an overlapping transmission. Accordingly, the apparatus will not cause interference to the other devices of its network. If no ongoing transmission is detected in block 502 or if the ongoing transmission has been detected but that the overlapping transmission is determined to be allowed, the apparatus may proceed to block 506. The determining of the allowance of the overlapping transmission may be based on detecting a frame transmitted by an apparatus of another wireless network, wherein the frame comprises the above-described Color field indicating the allowance of the overlapping transmissions.

In block 506, the apparatus determines the MCS currently used and associated channel assessment threshold. The MCS may be determined according to any one of the embodiments described above in connection with FIGS. 3 and 4.

In an embodiment, block 506 comprises mapping the MCS to a SINR value according to a mapping table to provide an estimate of the SINR at the receiver, e.g. the other apparatus to which the apparatus intends to transmit a frame over the link. The mapping table may be derived on the basis of measurements carried out beforehand, and the mapping table may define a SINR value that is required to guarantee a determined PER for each MCS, e.g. 10% PER. An example of the mapping table is provided in Table 3 below.

TABLE 3

| MCS | SINR_Est | SINR_Bias | N | CCA_UB | CCA |
|---|---|---|---|---|---|
| 0 | 5.5 | 15 | −101 | −52 | −80.5 |
| 1 | 8.5 | 15 | −101 | −52 | −77.5 |
| 2 | 13.5 | 15 | −101 | −52 | −72.5 |
| 3 | 18 | 15 | −101 | −52 | −68 |
| 4 | 19 | 15 | −101 | −52 | −67 |
| 5 | 21.5 | 10 | −101 | −52 | −69.5 |
| 6 | 24 | 10 | −101 | −52 | −67 |
| 7 | 25 | 10 | −101 | −52 | −66 |
| 8 | 26.5 | 10 | −101 | −52 | −64.5 |
| 9 | 28.5 | 10 | −101 | −52 | −62.5 |

In the Table 3, the values of the SINR_Est and SINR_Bias are in decibels (dB), the values of the noise power N, an upper bound for the channel assessment threshold (CCA_UB), and the channel assessment threshold (CCA) are in dBm. In Table 3, the noise power may have a value that is measured specific for the channel or bandwidth currently employed. A general value for the power spectral density of thermal noise is −174 dBm/Hz, so for a 20 MHz channel the noise power N is −101 dBm. In embodiments where the apparatuses employ variable bandwidths, the noise power may be adapted to the bandwidth currently in use by applying the power spectral density of the thermal noise to the bandwidth.

The SINR_Bias may define a bias factor for the channel assessment threshold, wherein the first apparatus may determine the bias factor according to a determined criterion. The bias factor may be encoded to the mapping of Table 2 as well, but in that embodiment the same bias (e.g. 15 dB) may be applied to all MCSs. In the embodiment of Table 3, at least two different bias factors are used. In an embodiment, the bias factor for each MCS is determined on the basis of a network topology of the wireless network of the first apparatus. In another embodiment, the bias for each MCS is determined on the basis of fairness of channel access amongst the different MCSs. Without the bias factor, the links employing the higher order modulation (higher MCS index) may gain the channel more probably because of the higher threshold for determining the channel to be busy. The first apparatus may compensate for this phenomenon by assigning a higher bias value for the lower order MCS than for the higher order MCS. In an embodiment, the first apparatus may compute the bias factor according to the following algorithm:

$$\text{SINR\_Bias} = \frac{I_{tot,out,1}}{I_{maxout,1}} \times \frac{I_{tot,in,2}}{I_{max,in,2}}$$

wherein $I_{tot,out,1}$ represents the total outgoing interference from a transmitter, $I_{max,in,1}$ represents the maximum outgoing interference from the transmitter, $I_{tot,in,2}$ represents the total incoming interference in a receiver, and $I_{max,in,2}$ represents the maximum incoming interference in the receiver. The ratios may be estimated by measuring signals received in the first apparatus and the second apparatus (of FIG. 3 or 4), e.g. measuring detected beacon signals. Due to the channel reciprocity, the first apparatus may estimate the total outgoing interference and the maximum outgoing interference from the signals it has received. The second apparatus may measure the maximum incoming interference and the total incoming interference from the detected signals in a similar manner and signal the measured total and maximum interference values to the first apparatus for the computation of the SINR_Bias.

As seen from Table 3, the channel assessment threshold is computed as follows: CCA=SINR_Bias+SINR_Est+N. However, the embodiment of FIG. 5 may omit the use of the bias factor and use the common bias for all MCSs (as is done in Table 2 assuming 15 dB bias) or no bias at all. Accordingly, the channel assessment threshold may be computed as follows: CCA=SINR_Est+N. Upon selecting the channel assessment threshold in block 506, the apparatus may compare the channel assessment threshold with an upper bound for the threshold, if such is provided (block 508). The upper bound may be −52 dBm or −62 dBm, or any other upper bound value specifying an upper limit for the threshold. If the threshold selected in block 506 is lower than the upper bound (Yes in block 508), the apparatus may proceed with the selected threshold (block 510). On the other hand, if the threshold is higher than the upper bound (No in block 508), the apparatus may select the upper bound as the new channel assessment threshold (block 512). The upper bound may be used to ensure that the apparatus will not use channel assessment threshold values that would result in significant interference to other networks operating on the same channel. FIG. 6 illustrates another embodiment for selecting the channel assessment threshold. This algorithm is simplified in the sense that it does not consider the effect of the overlapping transmissions on the channel assessment threshold. The functions associated with the same reference number as used in FIG. 5 represent substantially similar functions. Referring to FIG. 6, the apparatus determines to attempt channel access in block 500 and maps the current MCS to the channel assessment threshold by employing the mapping table described above (with or without the bias factor). Then, the channel assessment is compared with the upper bound in the above-described manner. The process of FIG. 6 may be carried out whenever determining to attempt channel access.

Figure 7:
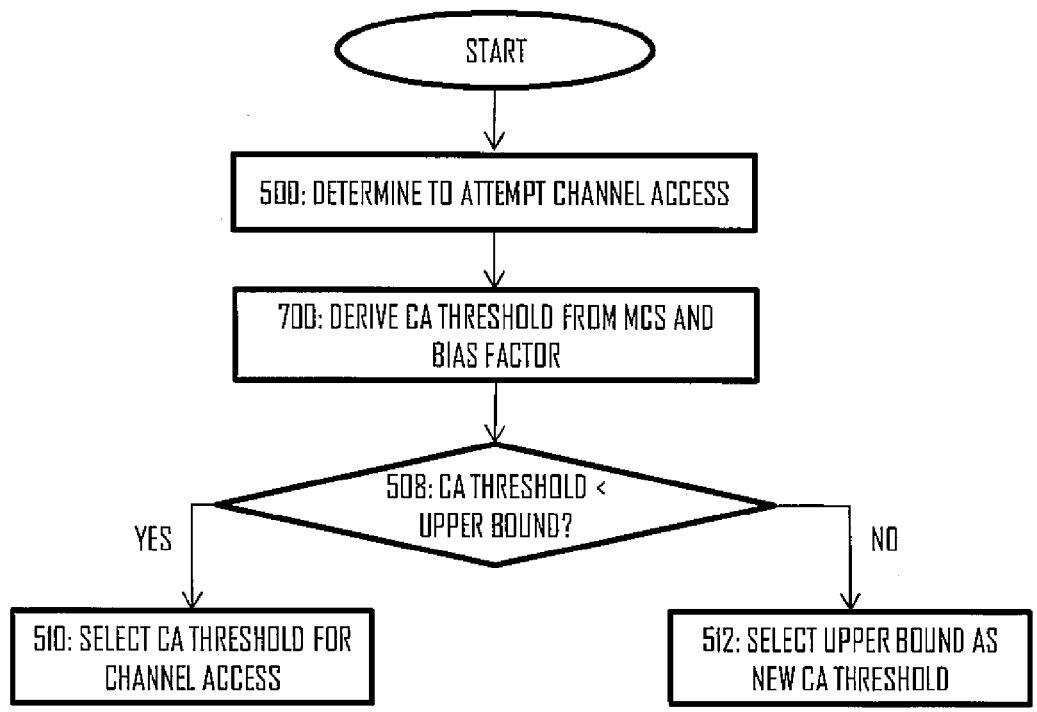

The embodiment of FIG. 7 illustrates the procedure where the bias factor is included. The bias factor specifying a different bias for at least two different MCs may be used in the above-described manner. Upon deriving the channel assessment threshold in block 700, the apparatus may determine the threshold on the basis of the MCS, the bias factor associated with the MCS, and the noise figure associated with the bandwidth. The comparison with the upper bound may be performed in the above-described manner.

In embodiments employing no upper bound, blocks 508 to 512 may be omitted.

Figure 8:
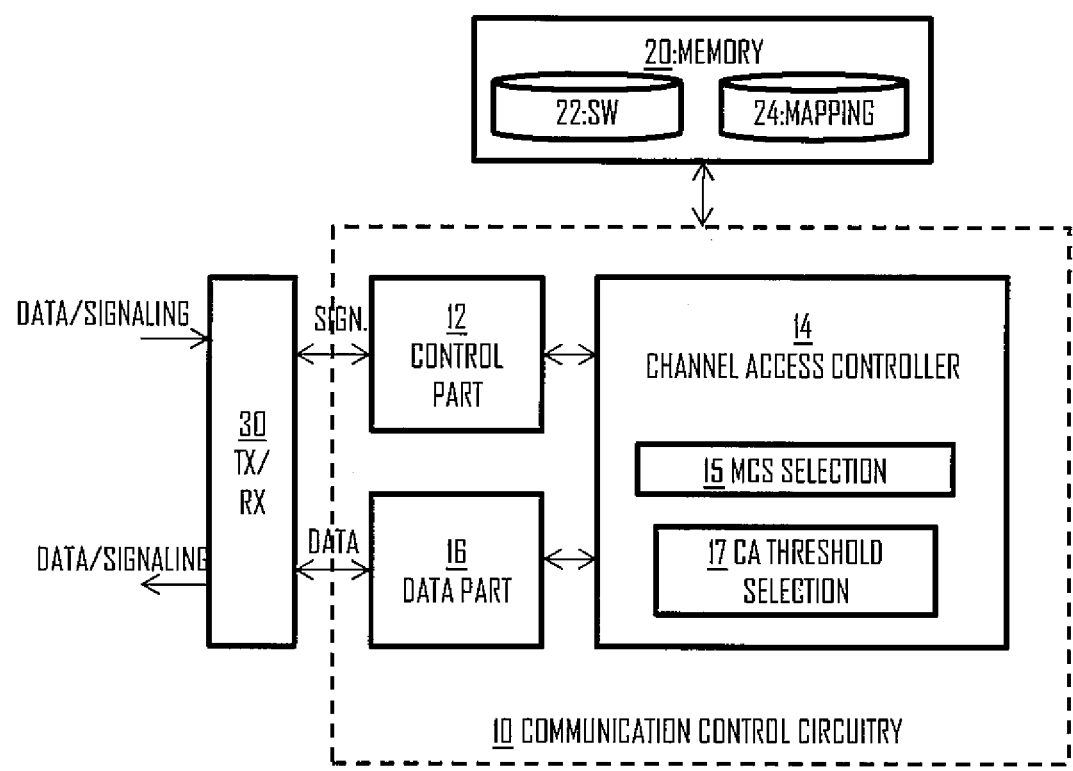
FIG. 8 illustrates a block diagram of an apparatus according to an embodiment of the invention.

FIG. 8 illustrates an embodiment of a structure of the above-mentioned functionalities of the apparatus, wherein the apparatus may be a terminal device, user equipment, a peer device, a client device, or an access node. The apparatus may comply with specifications of an IEEE 802.11 network and/or another wireless network. The apparatus may be defined as a cognitive radio apparatus capable of adapting its operation to a changing radio environment, e.g. to changes in parameters of another system on the same frequency band. The apparatus may be or may be comprised in a computer (PC), a laptop, a tablet computer, a cellular phone, a palm computer, or any other apparatus provided with radio communication capability. In another embodiment, the apparatus carrying out the above-described functionalities is comprised in such a device, e.g. the apparatus may comprise a circuitry, e.g. a chip, a chipset, a processor, a micro controller, or a combination of such circuitries in any one of the above-described devices.

Referring to FIG. 8, the apparatus may comprise a communication controller circuitry 10 configured to control wireless communications in the apparatus. The communication controller circuitry 10 may configure the establishment, operation, and termination of connections or associations in the apparatus, as described above. The communication controller circuitry 10 may comprise a control part 12 handling control signalling communication with respect to transmission, reception, and extraction of control or management frames including beacon messages, request messages, response messages, scanning or probing messages, discovery messages, RTS messages, and clear-to-send (CTS) messages. The control part 12 may also carry out processing of headers of data frames. The communication controller circuitry 10 may further comprise a data part 16 that handles transmission and reception of payload data when the apparatus is associated to one or more other apparatuses.

The communication control circuitry 10 may further comprise a channel access controller 14 configured to control the channel access of the apparatus. The channel access controller 14 may control parameters used in the channel assessment that may precede frame transmissions, e.g. the CCA procedure. The channel access controller 14 may further select transmission parameters for frame transmissions, e.g. the MCS. The channel access controller 14 may comprise, as a sub-circuitry, a MCS selection circuitry 15 configured to select the MCS for a link according to any one of the embodiments described above or according to another embodiment. The channel access controller 14 may comprise, as a sub-circuitry, a channel assessment threshold selection circuit 17 configured to select the channel assessment threshold on the basis of the MCS currently selected by the MCS selection circuitry 15 or on the basis of another factor representative of the SIR in the other apparatus. The channel assessment threshold selection circuit 17 may employ a mapping table 24 stored in a memory 20, wherein the mapping table 24 may comprise any one or more of the tables 1 to 3. The channel assessment threshold selection circuit 17 may further compare the selected channel assessment threshold with the upper bound in the above-described manner. The channel access controller 14 may thus carry out any one of the embodiments of the apparatus (the first apparatus in FIGS. 3 and 4) described above in connection with FIGS. 2 to 7.

The circuitries 12 to 17 of the communication controller circuitry 10 may be carried out by the one or more physical circuitries or processors. In practice, the different circuitries may be realized by different computer program modules. Depending on the specifications and the design of the apparatus, the apparatus may comprise some of the circuitries 12 to 17 or all of them.

The apparatus may further comprise the memory 20 that stores computer programs (software) 22 configuring the apparatus to perform the above-described functionalities. The memory 20 may also store communication parameters and other information needed for the wireless communications. The memory 20 may store the mapping table 24 mapping different MCSs to different channel assessment thresholds.

The apparatus may further comprise radio interface components 30 providing the apparatus with radio communication capabilities within one or more wireless networks. The radio interface components 30 may comprise standard well-known components such as an amplifier, filter, frequency-converter, (de)modulator, and encoder/decoder circuitries and one or more antennas. The apparatus may in some embodiments further comprise a user interface enabling interaction with the user of the communication device. The user interface may comprise a display, a keypad or a keyboard, a loudspeaker, etc.

In an embodiment, the apparatus carrying out the embodiments of the invention in the wireless device comprises at least one processor 10 and at least one memory 20 including a computer program code 22, wherein the at least one memory and the computer program code are configured, with the at least one processor, to cause the apparatus to carry out the functionalities of the wireless device according to any one of the embodiments of FIGS. 2 to 7. According to an aspect, when the at least one processor 10 executes the computer program code, the computer program code causes the apparatus to carry out the functionalities of the wireless device according to any one of the embodiments of FIGS. 2 to 7. According to another embodiment, the apparatus carrying out the embodiments of the invention in the wireless device comprises the at least one processor 10 and at least one memory 20 including a computer program code 22, wherein the at least one processor 10 and the computer program code 22 perform the at least some of the functionalities of the wireless device according to any one of the embodiments of FIGS. 2 to 7. Accordingly, the at least one processor, the memory, and the computer program code form processing means for carrying out embodiments of the present invention in the wireless device. According to yet another embodiment, the apparatus carrying out the embodiments of the invention in the wireless device comprises a circuitry including at least one processor 10 and at least one memory 20 including computer program code 22. When activated, the circuitry causes the apparatus to perform the at least some of the functionalities of the wireless device according to any one of the embodiments of FIGS. 2 to 7.

As used in this application, the term 'circuitry' refers to all of the following: (a) hardware-only circuit implementations, such as implementations in only analogue and/or digital circuitry, and (b) to combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) to circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular element, a baseband integrated circuit or applications processor integrated circuit for a wireless device.

The processes or methods described in FIGS. 2 to 7 may also be carried out in the form of a computer process defined by a computer program. The computer program may be in source code form, object code form, or in some intermediate form, and it may be stored in a transitory or a non-transitory carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital processing unit or it may be distributed amongst a number of processing units.

The present invention is applicable to wireless networks defined above but also to other suitable wireless communication systems. The protocols used, the specifications of wireless networks, their network elements and terminals, develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

The invention claimed is:

1. A method, comprising:
   determining, by an apparatus, a channel assessment threshold based on a factor representative of a signal-to-interference ratio at another apparatus with which said apparatus has established a link;
   determining, by the apparatus on the basis of the channel assessment threshold, whether or not a channel is free for transmission over the link;
   upon determining the channel to be free, causing transmission of a frame; and
   setting the channel, assessment threshold such that the channel is more probably considered to be free when the order of the modulation and coding scheme is high than when the order of the modulation and coding scheme is low.

2. The method of claim 1, wherein the factor representative of the signal-to-interference ratio at the other apparatus comprises a modulation and coding scheme used for transmission over the link, and wherein said determining the channel assessment threshold comprises:

determining, by the apparatus, said modulation and coding scheme used for transmission over the link;

determining, by the apparatus, the channel assessment threshold based on the modulation and coding scheme.

3. The method of claim 1, wherein the signal-to-interference ratio comprises a signal-to-interference-plus-noise ratio.

4. The method of claim 1, further comprising determining the channel assessment threshold implicitly on the basis of at least one frame acknowledgment message received from the other apparatus over the link.

5. The method of claim 1, further comprising determining the channel assessment threshold explicitly from a message received from the other apparatus of the link.

6. The method of claim 1, wherein the channel assessment threshold is used in a carrier-sensing mechanism employed by the apparatus when determining whether or not the channel is free.

7. The method of claim 4, wherein the determining whether or not the channel is free comprises:

measuring a signal from the channel and computing a value representing a signal strength of the measured signal;

comparing the value with the channel assessment threshold and determining, on the basis of the comparison, whether or not the channel is free.

8. The method of claim 1, wherein the channel assessment threshold is a reception sensitivity threshold.

9. An apparatus comprising:

at least one processor; and at least one memory including a computer program code, wherein the at least one memory and the computer program code are configured, with the at least one processor, to cause the apparatus to:

determine a channel assessment threshold based on a factor representative of a signal-to-interference ratio at another apparatus with which said apparatus is configured to establish a link;

determine, on the basis of the channel assessment threshold, whether or not a channel is free for transmission over the link; and upon determining the channel to be free, cause transmission of a frame; and set the channel assessment threshold such that the channel is more probably considered to be free when the order of the modulation and coding scheme is high than when the order of the modulation and coding scheme is low.

10. The apparatus of claim 9, wherein the factor representative of the signal-to-interference ratio at the other apparatus comprises a modulation and coding scheme used for transmission over the link, and wherein the at least one memory and the computer program code are configured, with the at least one processor, to cause the apparatus to determine the channel assessment threshold by:

determining said modulation and coding scheme used for transmission over the link;

determining the channel assessment threshold based on the modulation and coding scheme.

11. The apparatus of claim 9, wherein the signal-to-interference ratio comprises a signal-to-interference-plus-noise ratio.

12. The apparatus of claim 9, wherein the at least one memory and the computer program code are configured, with the at least one processor, to cause the apparatus to determine the channel assessment threshold implicitly on the basis of at least one frame acknowledgment message received from the other apparatus over the link.

13. The apparatus of claim 9, wherein the at least one memory and the computer program code are configured, with the at least one processor, to cause the apparatus to determine the channel assessment threshold explicitly from a message received from the other apparatus of the link.

14. The apparatus of claim 9, wherein the at least one memory and the computer program code are configured, with the at least one processor, to cause the apparatus to use the channel assessment threshold in a carrier-sensing mechanism employed when determining whether or not the channel is free.

15. The apparatus of claim 14, wherein the at least one memory and the computer program code are configured, with the at least one processor, to cause the apparatus to determine whether or not the channel is free by:

measuring a signal from the channel and computing a value representing a signal strength of the measured signal;

comparing the value with the channel assessment threshold and determining, on the basis of the comparison, whether or not the channel is free.

16. A computer program product embodied on a non-transitory distribution medium readable by an apparatus and comprising program instructions which, when loaded into the apparatus, execute a computer process comprising:

determining, by the apparatus, a channel assessment threshold based on a factor representative of a signal-to-interference ratio at another apparatus with which said apparatus has established a link;

determining, by the apparatus on the basis of the channel assessment threshold, whether or not a channel is free for transmission over the link; and upon determining the channel to be free, causing transmission of a frame; and setting the channel assessment threshold such that the channel is more probably considered to be free when the order of the modulation and coding scheme is high than when the order of the modulation and coding scheme is low.

* * * * *